(12) United States Patent
Albagli et al.

(10) Patent No.: US 6,384,400 B1
(45) Date of Patent: May 7, 2002

(54) HIGH RESOLUTION AND HIGH LUMINANCE SCINTILLATOR AND RADIATION IMAGER EMPLOYING THE SAME

(75) Inventors: Douglas Albagli, Clifton Park; George Edward Possin, Niskkayuna; Sung Su Han, Niskayuna; Michael Clement DeJule, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/451,030

(22) Filed: Nov. 29, 1999

(51) Int. Cl.[7] ................................. H01J 40/14
(52) U.S. Cl. ............... 250/214 VT; 250/208.1; 250/227.2; 250/370.11
(58) Field of Search ............ 250/214 VT, 227.11, 250/227.2, 227.24, 227.28, 208.1, 486.1, 461.2, 370.08, 370.09, 370.11, 207; 313/532, 528; 385/115, 116, 120

(56) References Cited

U.S. PATENT DOCUMENTS

| 4,788,436 A | * 11/1988 | Koechner ............... 250/485.1 |
| 5,108,959 A | 4/1992 | Buchanan et al. |
| 5,120,970 A | 6/1992 | Buchanan et al. |
| 5,122,671 A | 6/1992 | Buchanan et al. |
| 5,391,320 A | 2/1995 | Buchanan et al. |
| 5,401,668 A | 3/1995 | Kwasnick et al. |
| 5,594,253 A | 1/1997 | Bueno et al. |
| 5,636,299 A | 6/1997 | Bueno et al. |

* cited by examiner

*Primary Examiner*—Que T. Le
(74) *Attorney, Agent, or Firm*—Lester R. Hale; Noreen C. Johnson

(57) ABSTRACT

A fiber optic scintillator includes, for example, a first plurality of radiation absorbing elements comprising a scintillating material for converting radiation into light and a second plurality of radiation absorbing elements interspersed among the first plurality of radiation absorbing elements. The first plurality of radiation absorbing elements has a first radiation absorption efficiency. The second plurality of radiation absorbing elements has a second radiation absorption efficiency and an effective atomic number greater than about 50. The second radiation absorption efficiency is greater than said first radiation absorption efficiency. A scintillator forming method provides a bundle of the second plurality of radiation absorbing elements interspersed among the first plurality of radiation absorbing elements by drawing the bundle, The drawn bundle is cut into a plurality of sections. The plurality of sections are assembled to form the scintillator having an array of parallel first and second radiation absorbing elements.

22 Claims, 2 Drawing Sheets

HIGH RESOLUTION AND HIGH LUMINANCE SCINTILLATOR AND RADIATION IMAGER EMPLOYING THE SAME

BACKGROUND OF THE INVENTION

This invention relates generally to radiation imaging, and more particularly, to radiation imaging via the conversion of radiation into visible light impinging on a light sensitive imaging array.

Radiation imagers typically include a scintillator coupled to a light sensitive imaging array. Radiation absorbed in the scintillator, such as a fiber optic scintillator, result in the emission of optical photons which in turn pass into the light sensitive imaging array. The light sensitive imaging array, such as a plurality of photodiodes, generates an electrical signal corresponding to the incident optical photon flux. Each of the photodiodes is coupled to circuitry to allow charge collected on the photodiode to be read.

Fiber optic scintillators or fiber optic scintillating plates are formed from an array of scintillating glass fibers disposed substantially parallel to one another. The core of each of the glass fibers is doped with a scintillating material so that the glass fibers scintillate when excited by radiation such as x-rays. The surface of each of the glass fibers is clad with a non-scintillating, lower optical index glass material.

Light generated in the scintillator in response to absorption of radiation in the core of a scintillating glass fiber is emitted isotropically. The portion of the light emitted at an angle less than the optical critical angle for the fiber is reflected and guided within the glass fiber and preferably made to exit from a surface of the fiber optic scintillator directed towards the light sensitive imaging array. The portion of the light emitted at an angle greater than the optical critical angle for the fiber exits the side of the glass fiber and thus may impinge on and be detected elsewhere by the light sensitive imaging array. This latter portion of the light or so called "optical cross-talk" results in image quality degradation.

While fiber optic scintillators are generally suitable for medical imaging, for example, using x-rays having energies of about 50 KeV to about 80 KeV, such fiber optic scintillators have a number of drawbacks for use in industrial imaging applications such as nondestructive testing of parts using x-rays having high energies, e.g., about 100 KeV or greater.

For example, increasing the density of the scintillating glass fibers, in order to stop and absorb high energy x-rays, undesirably results in a reduction of the brightness or luminance of the scintillator. In particular, high-density glass fibers doped with a scintillating material typically exhibit a poorer conversion of absorbed radiation into optical photons compared to low-density glass fibers.

In addition, increasing the thickness of the scintillator in order to stop and absorb the high energy x-ray s also undesirably results in increased optical cross-talk which degrades the resulting detected image.

Non-scintillating, black or colored glass fibers, so called "extramural absorber" (EMA) fibers have been used, e.g., interspersed among the plurality of scintillating glass fibers, for the purpose of absorbing stray light before the light reaches the bottom surface of the fiber optic scintillator. However, while EMA fibers reduce optical cross-talk and thus improve the resolution of the scintillator, the image brightness or luminance is also reduced as fewer optical photons reach the image plane at the bottom of the fiber optic scintillator.

Therefore, there is a need for a high resolution and high luminous scintillator for use in medical imaging and in industrial imaging using high energy radiation.

SUMMARY OF THE INVENTION

The present invention provides a scintillator having a first plurality of radiation absorbing elements comprising a scintillating material for converting radiation into light, and a second plurality of radiation absorbing elements interspersed among the first plurality of radiation absorbing elements. The first plurality of radiation absorbing elements has a first radiation absorption efficiency, and the second plurality of radiation absorbing elements has a second radiation absorption efficiency which is greater than the first radiation absorption efficiency.

In another aspect of the invention, a radiation imager is provided having a light sensitive imaging array, and a scintillator, as noted above, disposed adjacent to the light sensitive imaging array.

In still another aspect of the invention, a method for forming a scintillator includes providing a bundle, comprising a first plurality of radiation absorbing elements having a scintillating material for converting radiation into light and a second plurality of radiation absorbing elements, as noted above, interspersed among the first plurality of radiation absorbing elements, drawing the bundle to reduce the cross-section of the first plurality of radiation absorbing elements and the second plurality of radiation absorbing elements, cutting the drawn bundle into a plurality of sections, and assembling the plurality of sections to form a scintillator having an array of parallel first and second radiation absorbing elements.

BRIEF DESCRIPTION OF THE DRAWINGS

FIG. 4 is a top view of an alternative scintillator of the present invention.

DETAILED DESCRIPTION OF THE INVENTION

Figure 1:
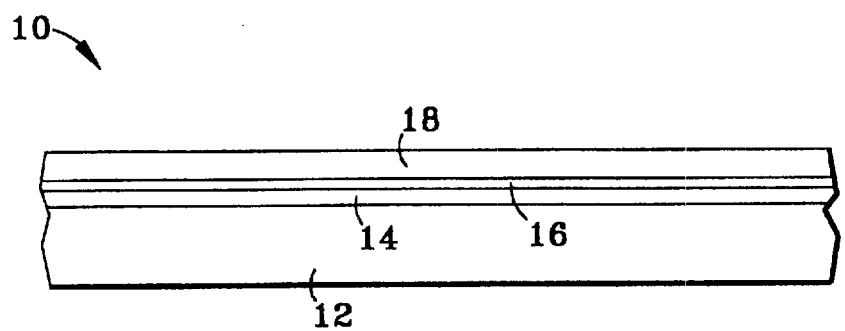
FIG. 1 is a cross-sectional, side view of a portion of an exemplary radiation imager of the present invention.

FIG. 1 is a cross-sectional view of a portion of an exemplary radiation imager 10 of the present invention. Radiation imager 10 includes a substrate 12 on which a light sensitive imaging array 14 is disposed, and a fiber optic scintillator 18 optically coupled to light sensitive imaging array 14. Desirably, a barrier layer 16 is disposed between light sensitive imaging array 14 and scintillator 18 for protecting light sensitive imaging array 14. As explained in greater detail below, scintillator 18 provides a high resolution and high luminous scintillator for use in, for example, medical imaging and desirably, industrial imaging using high energy radiation such as x-ray radiation having energies of about 100 KeV or greater.

Light sensitive imaging array 14 includes a plurality of photosensitive elements or light sensitive imaging regions that are typically arranged in rows and columns on substrate 12. For example, each light sensitive imaging region typically comprises a photodiode disposed over a bottom contact pad and below an upper conductive layer. The upper conductive layer commonly includes a transparent conductive material such as indium tin oxide or the like. A suitable light sensitive imaging array is disclosed in greater detail in U.S. Pat. No. 5,401,668.

Fiber optic scintillator 18 emits optical photons or visible light in response to the absorption of incident radiation. The emitted visible light then penetrates barrier layer 16 impinging on light sensitive imaging array 14. The impingement of the light results in voltage levels that are periodically read and interpreted as digital data. For example, light sensitive imaging array 14 may be made operable via suitable external electric circuitry, e.g., data lines and thin film transistors (TFTs).

Figure 2:
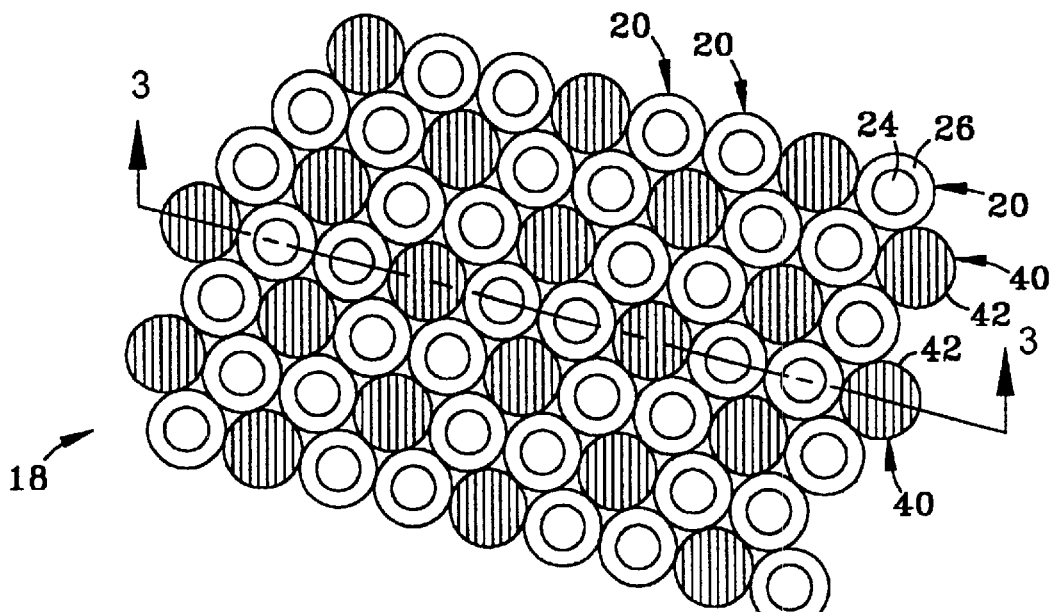
FIG. 2 is an enlarged, top view of the scintillator shown in FIG. 1.
Figure 3:
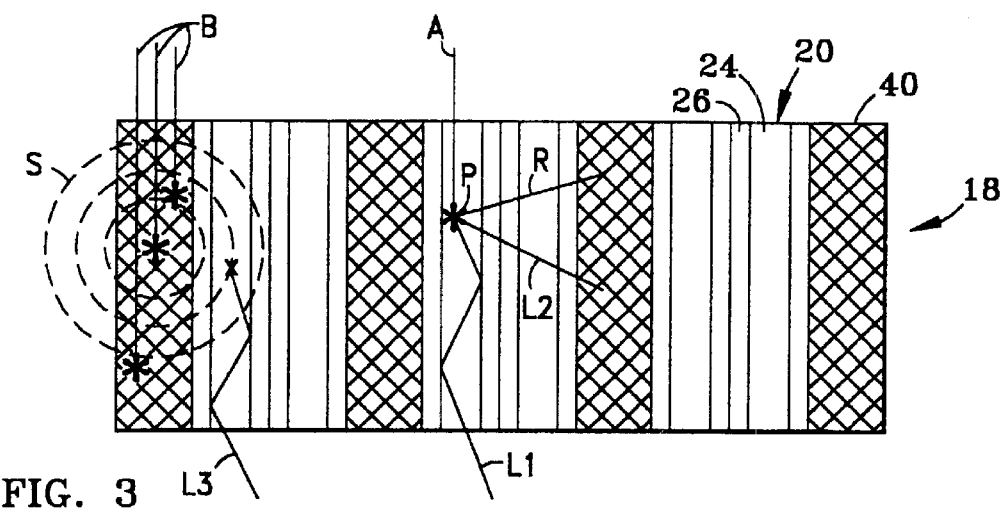
FIG. 3 is an enlarged, cross-sectional view of the scintillator taken along line 3—3 of FIG. 2.

FIGS. 2 and 3 illustrate, in greater detail, exemplary fiber optic scintillator 18 which includes a first plurality of radiation absorbing elements 20 and a second plurality of radiation absorbing elements 40 interspersed among the first plurality of first radiation absorbing elements 20. In this exemplary scintillator, the first and second plurality of radiation absorbing elements comprise a plurality of parallel fibers formed into an array.

For example, the plurality of radiation absorbing elements 20 include a first plurality of scintillating fibers, each of which include a respective scintillating core 24 with a respective first refractive index surrounded by a cladding 26 desirably having a second lower refractive index. Core 24 desirably includes a low-density glass doped with a scintillating material. For example, the scintillating fibers may include a terbium-activated or gadolinium-activated silicate luminescent glass core and a silicate glass cladding. Advantageously, by using a low-density glass, the scintillating material provides a higher conversion of absorbed radiation into optical photons compared to using a high-density glass.

The second plurality of radiation absorbing elements 40 include, for example, a plurality of non-scintillating fibers comprising a high-density glass. Desirably, the high-density glass is also doped with an optical absorber to absorb light. Advantageously, the high-density glass provides a greater radiation absorption efficiency compared to the plurality of scintillating fibers.

Suitable high-density glasses include flint glass or lead crystal containing lead oxide. Other suitable high-density glasses include glasses having an effective atomic number (Z) desirably greater than 50, e.g., high-density glasses containing barium (Z=56), platinum (Z=78), lead (Z=82), or combinations thereof. For silicate-based glasses, desirably, the high-density glass comprises about 60 percent to about 80 percent silicate glass and about 20 percent to about 40 percent of one or more substances having an atomic number greater than 50. Suitable optical absorbing materials for absorbing optical light include, for example, incorporating iron or cobalt into the high-density glass.

By providing the non-scintillating fibers with a greater radiation absorbing efficiency (e.g., x-rays absorbed in a material, measured per unit volume) than the scintillating fibers, it is possible to increase the absorption of radiation of the scintillator, increase the brightness of illumination of the scintillator, and increase the resolution of the scintillator compared to prior art scintillators.

In the scintillating fibers, the absorption of imaging radiation is primarily via Compton scattering interactions, i.e., a portion of the energy of an x-ray is imparted to an election with a resulting reduced energy x-ray (i.e., Compton x-ray). As best shown in FIG. 3, an x-ray A enters a top surface of scintillator 18 and is absorbed at a point P in core 24 of the scintillating fiber resulting in a Compton x-ray and an energized electron which interacts with the scintillating material in the scintillating fibers to emit optical photons, e.g., light rays L1 and L2. Light ray L1, emitted at an angle greater than the critical angle is internally reflected within core 24 and emitted from a bottom surface of scintillator 18. Light ray L2, emitted at an angle greater than the critical angle passes through the scintillating fiber and continues through adjacent scintillating fibers until it is absorbed by a high-density glass fiber.

Another function of the plurality of high-density glass fibers is to absorb Compton x-rays (e.g., Compton x-ray R) which travel through the scintillating fibers until they are absorbed by a high-density glass fiber. These Compton x-rays, i.e., "Compton x-ray cross-walk," would otherwise have a very long range in the scintillator (e.g., across multiple fiber dimensions) and degrade the resolution of the scintillator. Desirably, the ratio of high-density glass fibers to scintillating, low-density fibers is about 1 to 2.

Still another function of the plurality of high-density glass fibers is to increase the radiation stopping power of the scintillator. For example, x-rays B which interact with high-density glass fiber produce high-energy electron showers S, which interact in adjacent scintillating fibers producing light rays, e.g., light ray L3, which increase the brightness or luminance of the scintillator. The electron range for electron showers by high energy x-rays, e.g., 100 KeV, are of the order of about 50 microns to about 100 microns. Hence, if the fiber size is of the order of 20 microns, most of the electrons will escape the high-density glass fibers and produce light in the scintillating glass fibers.

Figure 4:
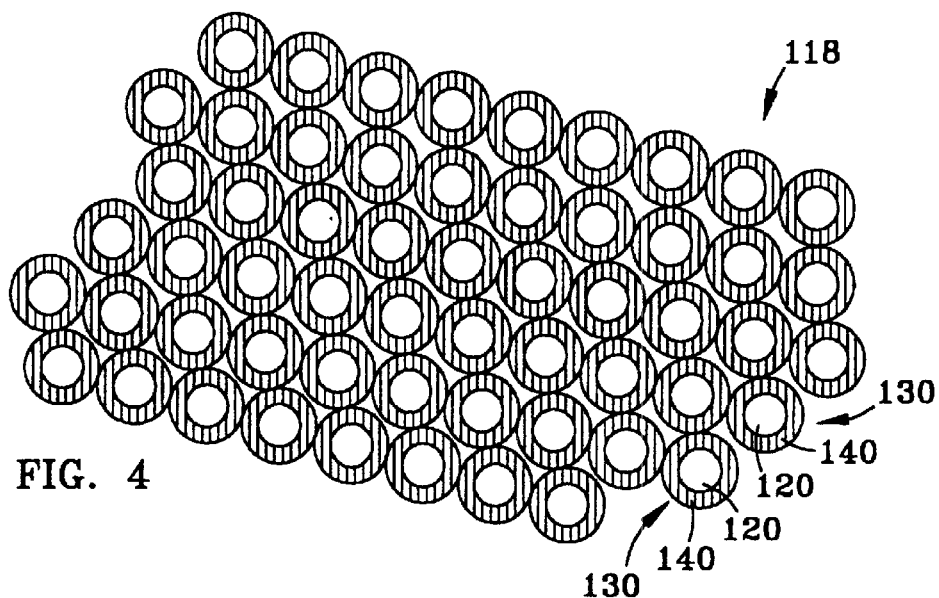
FIG. 4 invention.
Figure 5:
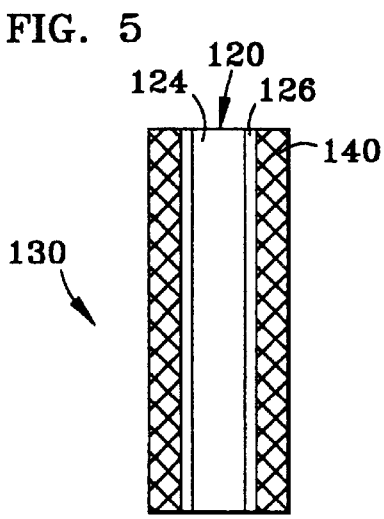
FIG. 5 is an enlarged, cross-sectional, side view of one of fibers forming the scintillator shown in FIG. 4.

FIGS. 4 and 5 illustrate an alternate embodiment of a fiber optic scintillator 118 having a plurality of double clad radiation absorbing fibers 130. Each of radiation absorbing fibers 130 includes an inner scintillating fiber 120 surrounded by an outer radiation absorbing cladding 140. Inner scintillating fiber 120 desirably comprises a scintillating glass fiber core 124 with a lower optical index glass cladding 126 to increase the critical angle for internal reflection of light. Outer radiation absorbing cladding 140 desirably comprises a high-density glass as discussed above in greater detail. As also discussed above, the high-density glass cladding is desirably doped with optical absorbers to absorb light emitted outside the critical angle of the scintillating fiber.

The double clad radiation absorbing fibers of scintillator 118 has two advantages. First, the high-density glass is in closer proximity to the scintillating fiber so that high energy electron showers will be efficiently coupled to the scintillating fibers. Second, the scintillator requires fibers of only one type thereby facilitating the manufacturing process (discussed below) of the scintillator.

A method for fabricating a scintillator of the present invention includes forming a relatively small number of elements into a bundle, using heat and mechanical means to form them into a tight bundle and then drawing the bundles down to small diameters, cutting the fiber bundles into sections, and assembling the sections into larger arrays of fibers which are heat fused and cut into slabs.

For the scintillator shown in FIGS. 4 and 5, the initial double clad radiation absorbing fibers are formed, for example, by inserting the scintillating fiber inside of a lower optical index glass tube and then inserting the assembly into a larger high-density glass tube. This assembly is then be heated and drawn down to a smaller diameter either before or after assembling into a fiber bundle.

Thus, while various embodiments of the present invention have been illustrated and described, it will be appreciated to those skilled in the art that many changes and modifications may be made thereunto without departing from the spirit and scope of the invention.

What is claimed is:

1. A scintillator comprising:
    a first plurality of radiation absorbing elements comprising a scintillating material for converting radiation into light;
    a second plurality of radiation absorbing elements interspersed among said first plurality of radiation absorbing elements; and
    said first plurality of radiation absorbing elements having a first radiation absorption efficiency, said second plurality of radiation absorbing elements having a second radiation absorption efficiency and an effective atomic number greater than about 50, and said second radiation absorption efficiency being greater than said first radiation absorption efficiency.

2. The scintillator of claim 1 wherein said second plurality of radiation absorbing elements being operable to absorb radiation via a photoelectric effect and produce a plurality of electron showers convertible to light in said first plurality of radiation absorbing elements.

3. The scintillator of claim 1 wherein said first plurality of radiation absorbing elements being operable to absorb radiation via Compton scattering, and wherein said second plurality of radiation absorbing elements being operable to absorb radiation generally from Compton scattering in said first plurality of radiation absorbing elements.

4. The scintillator of claim 1 wherein said first plurality of radiation absorbing elements comprise a plurality of scintillating fibers, and said second plurality of radiation absorbing elements comprise a plurality of non-scintillating fibers, wherein said non-scintillating fibers have a fiber size of about 20 microns.

5. The scintillator of claim 1 wherein said second plurality of radiation absorbing elements further comprise an optical absorbing material, wherein said optical absorbing material is selected from the group consisting of iron, cobalt, and combinations thereof.

6. The scintillator of claim 1 wherein said first plurality of radiation absorbing elements comprise a low-density glass material and said second plurality of radiation absorbing elements comprise a high density glass material, wherein said high density glass material comprises material selected from the group consisting of barium, platinum, lead, and combinations thereof.

7. The scintillator of claim 1 wherein said first plurality of radiation absorbing elements comprise at least one of a luminescent terbium-activated glass material and luminescent gadolinium-activated glass material, and said second plurality of radiation absorbing elements comprise a lead oxide glass material.

8. A scintillator comprising:
    a plurality of radiation absorbing fibers, each comprising an inner scintillating fiber having a scintillating material for converting radiation into light and an outer radiation absorbing cladding surrounding said inner scintillating fiber; and
    said inner scintillating fiber having a first radiation absorption efficiency, said outer radiation absorbing cladding having a second radiation absorption efficiency and an effective atomic number greater than about 50, and said second radiation absorption efficiency being greater than said first radiation absorption efficiency.

9. A radiation imager comprising:
    a light sensitive imaging array;
    a scintillator disposed adjacent to said light sensitive imaging array, said scintillator comprising:
    a first plurality of radiation absorbing elements comprising a scintillating material for converting radiation into light;
    a second plurality of radiation absorbing elements interspersed among said first plurality of radiation absorbing elements; and
    said first plurality of radiation absorbing elements having a first radiation absorption efficiency, said second plurality of radiation absorbing elements, having a second radiation absorption efficiency and an effective atomic number greater than about 50, and said second radiation absorption efficiency being greater than said first radiation absorption efficiency.

10. The radiation imager of claim 9 wherein said second plurality of radiation absorbing elements being operable to absorb radiation via a photoelectric effect and produce a plurality of electron showers convertible to light in said first plurality of radiation absorbing elements.

11. The radiation imager of claim 9 wherein said first plurality of radiation absorbing elements being operable to absorb radiation generally via Compton scattering, and wherein said second plurality of radiation absorbing elements operable to absorb Compton radiation from Compton scattering in said first plurality of radiation absorbing elements.

12. The radiation imager of claim 9 wherein said first plurality of radiation absorbing elements comprise a plurality of scintillating fibers, and said second plurality of radiation absorbing elements comprise a plurality of nonscintillating fibers, wherein said non-scintillating fibers have a fiber size of about 20 microns.

13. The radiation imager of claim 9 wherein said second plurality of radiation absorbing elements further comprise an optical absorbing material, wherein said optical absorbing material is selected from the group consisting of iron, cobalt, and combinations thereof.

14. The radiation imager of claim 9 wherein said first plurality of radiation absorbing elements comprise a low-density glass material and said second plurality of radiation absorbing elements comprises a high-density glass material, wherein said high density glass material comprises material selected from the group consisting of barium, platinum, lead, and combinations thereof.

15. The radiation imager of claim 9 wherein said first plurality of radiation absorbing elements comprise at least one of a luminescent terbiuma-ctivated glass material and luminescent gadolinium-activated glass material, and said second plurality of radiation absorbing elements comprise a lead oxide glass material.

16. A radiation imager comprising:
    a light sensitive imaging array:
    a scintillator disposed adjacent to said light sensitive imaging array, said scintillator comprising:
    a plurality of radiation absorbing fibers, each comprising an inner scintillator fiber having a scintillating material for converting radiation into light and an outer radiation absorbing cladding surrounding said inner scintillating fiber; and said inner scintillating fiber having a first radiation absorption efficiency, said outer radiation absorbing cladding having a second radiation absorption efficiency, and said second radiation absorption efficiency being greater than said first radiation absorption efficiency, wherein said outer radiation absorbing cladding has an effective atomic number greater than about 50.

17. A method for forming a scintillator, the method comprising:

providing a bundle comprising a first plurality of radiation absorbing elements comprising a scintillating material for converting radiation into light and a second plurality of radiation absorbing elements interspersed among the first plurality of radiation absorbing elements, the first plurality of radiation absorbing elements having a first radiation absorption efficiency, the second plurality of radiation absorbing elements having a second radiation absorption efficiency and an effective atomic number greater than about 50, and the second radiation absorption efficiency being greater than the first radiation efficiency;

drawing the bundle to reduce the cross-section of the first plurality of radiation absorbing elements and the second plurality of radiation absorbing elements;

cutting the drawn bundle into a plurality of sections; and assembling the plurality of sections to form the scintillator having an array of parallel first and second radiation absorbing elements.

18. The method of claim 17 wherein the first plurality of radiation absorbing elements comprise a plurality of fibers, and the second plurality of radiation absorbing elements comprise a plurality of fibers, wherein said second plurality of radiation absorbing elements have a fiber size of about 20 microns.

19. The method of claim 17 wherein the first plurality of radiation absorbing elements comprise a low-density glass material and the second plurality of radiation absorbing elements comprises a high-density glass material, wherein said high density glass material comprises material selected from the group consisting of barium, platinum, lead, and combinations thereof.

20. The method of claim 17 wherein the drawing further comprises heating the bundle.

21. The method of claim 17 wherein the assembling comprises fusing together the plurality of sections.

22. A method for forming a scintillator, the method comprising:

providing a bundle comprising a plurality of radiation absorbing fibers comprising an inner scintillating fiber having a scintillating material for converting radiation into light, and an outer radiation absorbing cladding surrounding said inner scintillating fiber, said scintillating fiber having a first radiation absorption efficiency, said outer radiation absorbing cladding having a second radiation absorption efficiency and an effective atomic number greater than about 50, and said second radiation absorption efficiency being greater than said first radiation absorption efficiency;

drawing the bundle to reduce the cross-section of the plurality of radiation absorbing fibers;

cutting the drawn bundle into a plurality of sections; and assembling the plurality of sections to form the scintillator having an array of parallel radiation absorbing fibers.

* * * * *